United States Patent
Brown, Jr.

(10) Patent No.: US 6,587,041 B1
(45) Date of Patent: Jul. 1, 2003

(54) SEMI-TRACTOR FIFTH WHEEL SENSOR AND RAIL CAR STANCHION SENSOR FOR A TRAILER

(75) Inventor: James B. Brown, Jr., Lafayette, IN (US)

(73) Assignee: Wabash Technology Corporation, Naperville, IL (US)

( * ) Notice: Subject to any disclaimer, the term of this patent is extended or adjusted under 35 U.S.C. 154(b) by 0 days.

(21) Appl. No.: 09/553,490

(22) Filed: Apr. 20, 2000

(51) Int. Cl.$^7$ .............................................. G08B 21/00
(52) U.S. Cl. .................. 340/431; 340/435; 340/825.06; 340/991; 340/903; 340/904; 340/993
(58) Field of Search ................................ 340/431, 435, 340/425.5, 436, 438, 825.06, 991, 992, 993, 994, 903, 904

(56) References Cited

U.S. PATENT DOCUMENTS

| | | | |
|---|---|---|---|
| 3,653,686 A | * | 4/1972 | Roesies ...................... 280/421 |
| 3,924,256 A | | 12/1975 | Cohen |
| 4,430,637 A | * | 2/1984 | Koch-Ducker et al. ..... 340/641 |
| 4,438,430 A | | 3/1984 | Young et al. |
| 4,750,197 A | | 6/1988 | Denekamp et al. |
| 4,816,803 A | | 3/1989 | Brown |
| 4,866,963 A | | 9/1989 | Leininger et al. |
| 4,952,908 A | * | 8/1990 | Sanner ........................ 340/429 |
| 5,025,253 A | * | 6/1991 | Dilullo et al. .......... 340/825.06 |
| 5,277,285 A | * | 1/1994 | Musachio ....................... 191/6 |
| 5,539,810 A | | 7/1996 | Kennedy, III et al. ....... 340/431 |
| 5,602,526 A | | 2/1997 | Read |
| 5,630,603 A | * | 5/1997 | Turner et al. ............. 280/407.1 |
| 5,685,578 A | | 11/1997 | Schneider |
| 5,905,433 A | | 5/1999 | Wortham ..................... 340/431 |
| 5,912,616 A | * | 6/1999 | Valentino ..................... 340/431 |
| 5,975,713 A | | 11/1999 | Brothers |
| 6,037,550 A | | 3/2000 | Bradley ....................... 702/174 |
| 6,252,497 B1 | * | 6/2001 | Dupay et al. ................ 340/431 |

* cited by examiner

Primary Examiner—Benjamin C. Lee
Assistant Examiner—Daniel Previl
(74) Attorney, Agent, or Firm—Trexler, Bushnell, Giangiorgi, Blackstone & Marr, Ltd.

(57) ABSTRACT

A system is provided for sensing the presence of a semi-tractor as the mechanical connection between a trailer and a fifth wheel of the semi-tractor is made, or for sensing the presence of a rail car as the mechanical connection between the trailer and a stanchion plate of the rail car is made. A sensor is provided in the floor of the trailer proximate to the kingpin. The sensor senses the presence of the fifth wheel or the rail car stanchion plate during the connection process. Control circuitry on the trailer processes and uses signals from the sensor to perform various functions.

22 Claims, 3 Drawing Sheets

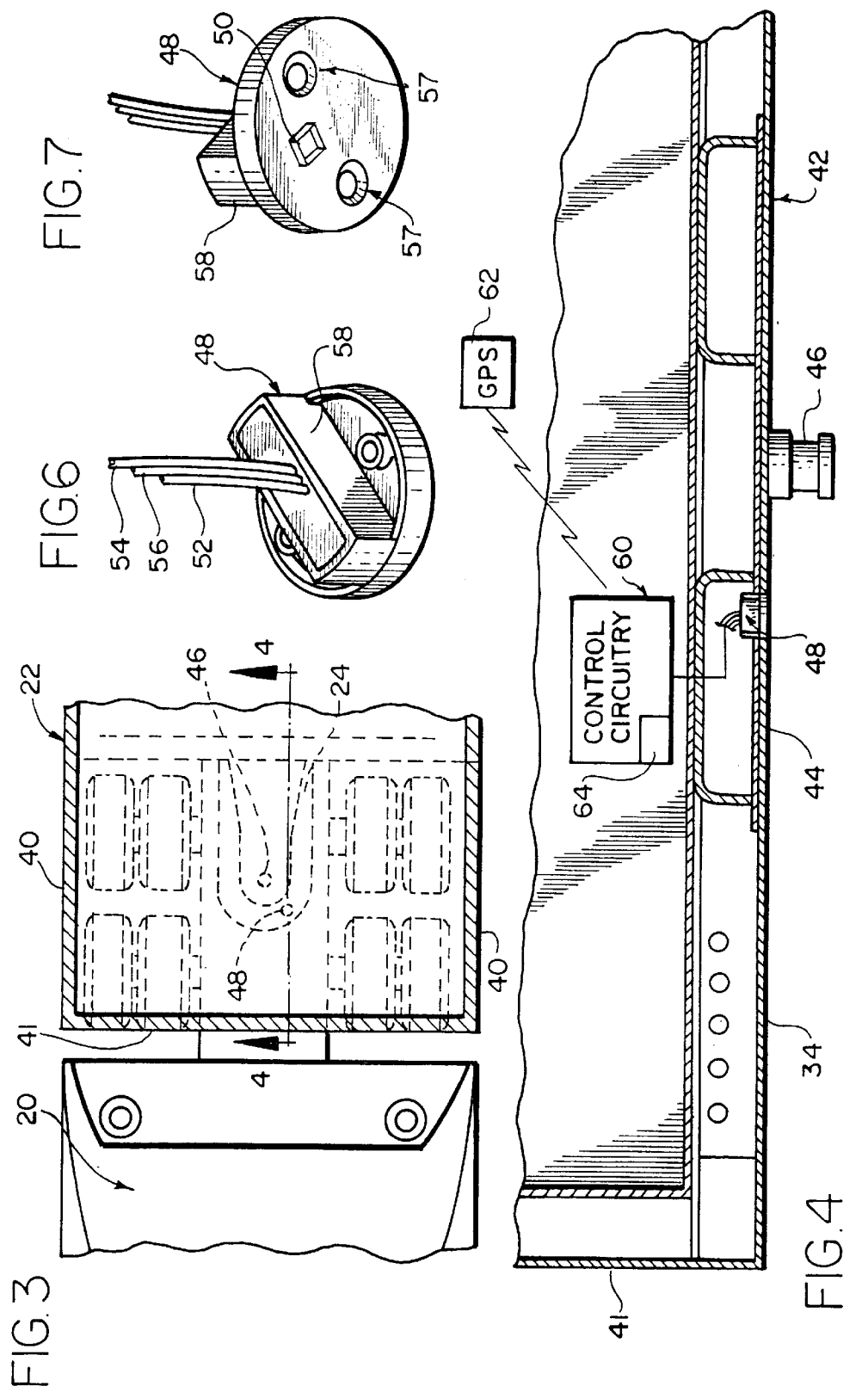

SEMI-TRACTOR FIFTH WHEEL SENSOR AND RAIL CAR STANCHION SENSOR FOR A TRAILER

BACKGROUND OF THE INVENTION

This invention is generally directed to a novel system that senses the presence of a semi-tractor as the mechanical connection between a trailer and a fifth wheel of the semi-tractor is made, or that senses the presence of a rail car as the mechanical connection between the trailer and a stanchion plate of the rail car is made.

Currently, some prior art systems sense the presence of a trailer when the trailer is connected to a semitractor, but these systems require that an electrical connection or a pneumatic connection be made between the trailer and the semi-tractor. Mechanical switches have been used to sense the presence of an electrical connector, known as the 7-way or J560, or the presence of the pneumatic connectors, commonly known as "gladhands". Some prior art systems are configured to electrically sense that a trailer is connected to the semi-tractor by sensing the presence of voltage on the J560 connector or in one of the harnesses. Other systems are configured to pneumatically sense that the trailer is connected to the semi-tractor by sensing the presence of air pressure on the braking supply line from the semi-tractor. A pressure switch or transducer has been used to accomplish this pneumatic sensing.

In the prior art, completing an electrical or pneumatic connection between the trailer and the semi-tractor is a secondary operation and may be forgotten by the operator. This can result in an error in the system operation—the trailer is connected to the semi-tractor, but the electrical or pneumatic connection is not made, so the system determines that the trailer is not connected to the semi-tractor.

The present invention senses the presence of the semi-tractor or the rail car without any additional operation. Other features and advantages of the present invention will become apparent upon a reading of the attached specification in combination with a study of the drawings.

SUMMARY OF THE INVENTION

The present invention discloses a system for sensing the presence of a semi-tractor as the mechanical connection between a trailer and a fifth wheel of the semi-tractor is made, or for sensing the presence of a rail car as the mechanical connection between the trailer and a stanchion plate of the rail car is made. A sensor is provided in the floor of the trailer proximate to the kingpin. The sensor senses the presence of the fifth wheel or the rail car stanchion plate during the connection process. Control circuitry on the trailer processes and uses signals from the sensor to perform various functions.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 3 is a crosssectional view along line 3—3 of FIG. 1;

FIG. 4 is a cross-sectional view along line 4—4 of FIG. 3;

FIG. 6 is a perspective view of a preferred sensor which is a component in the present invention;

FIG. 7 is a perspective view of the preferred sensor which is a component in the present invention.

DETAILED DESCRIPTION OF THE ILLUSTRATED EMBODIMENT

Figure 1:
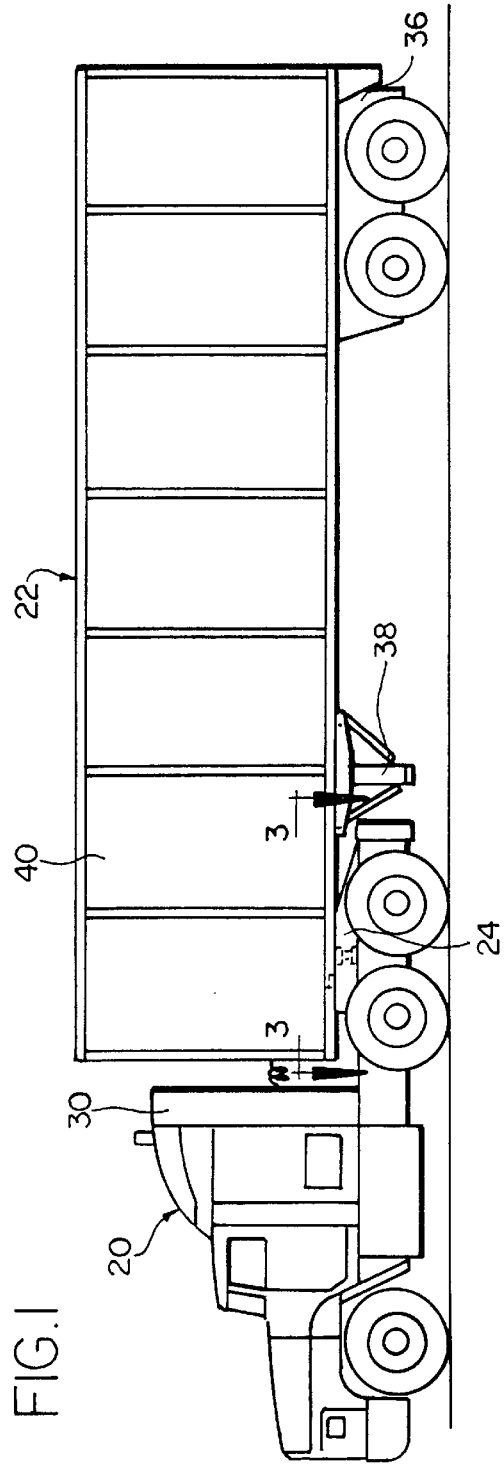
FIG. 1 is a side elevational view of a trailer connected to a semi-tractor.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a novel system that senses the presence of a semi-tractor as the mechanical connection between a trailer 22 and a fifth wheel 24 of the semi-tractor 20 is made, or the presence of a rail car 26 as the mechanical connection between the trailer 22 and a stanchion plate 28 of the rail car 26 is made.

The system of the present invention can be used to track the location of the trailer 22 when used with a trailer tracking system, so that the owner of the trailer 22 is able to locate the trailer 22 and to determine whether the trailer 22 is being utilized by knowing if the trailer 22 is connected to a semi-tractor 20 or is connected to a rail car 26. The system of the present invention can also be used in a security or control application. An example of using the system in a security or control application would be to only allow a device, such as a lift gate, to operate when the semi-tractor 20 is present, thus limiting unwanted use if the trailer 22 is not connected to a semi-tractor and is located in an unsecured area.

Figure 2:
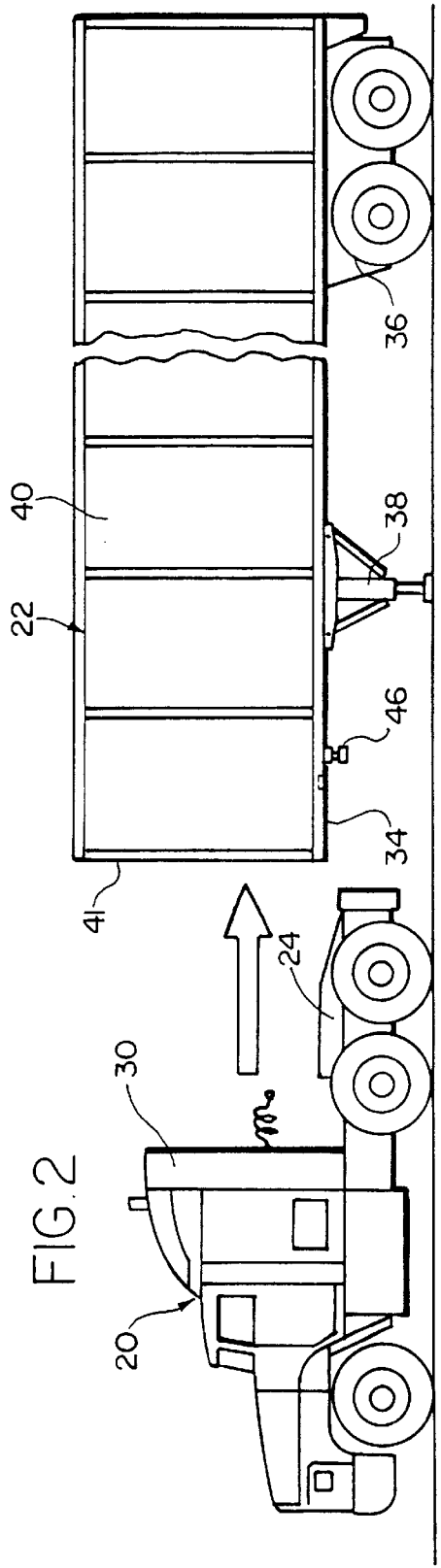
FIG. 2 is a side elevational view of the trailer and semi-tractor as shown in FIG. 1, with the trailer being disconnected from the semi-tractor.

The semi-tractor 20 which is used with the present invention is conventional. As illustrated in FIGS. 1 and 2, the semi-tractor 20 includes a cab 30 and a conventional fifth wheel 24 formed of a ferrous material. The trailer 22 is connected to the fifth wheel 24 in a conventional manner.

Figure 5:
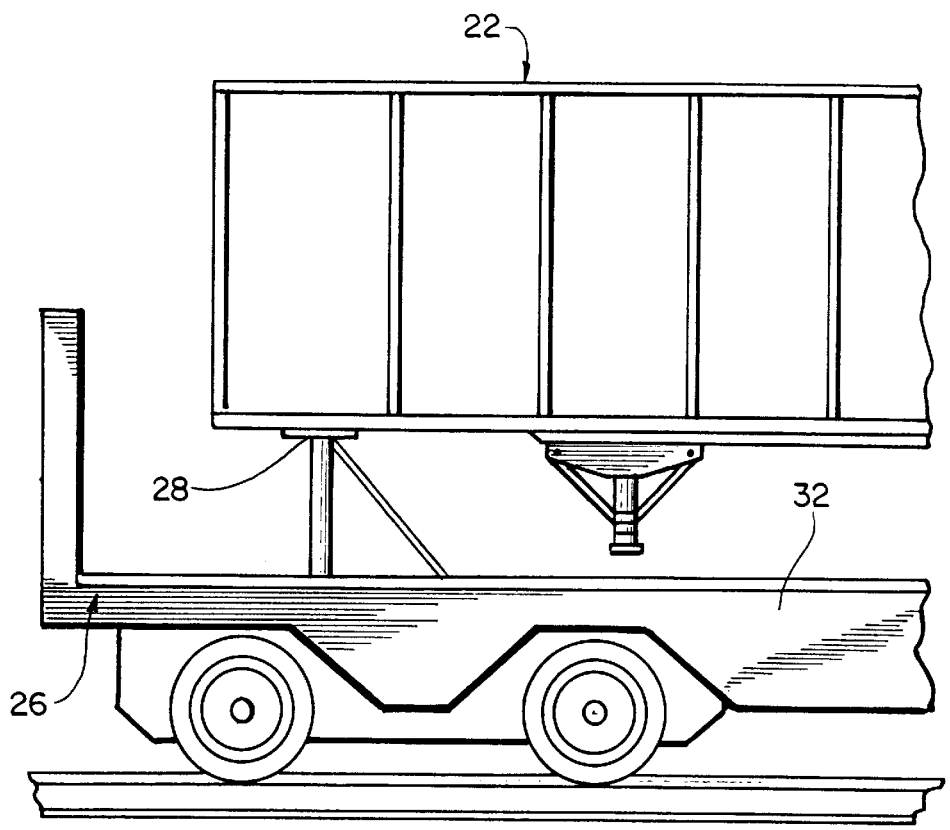
FIG. 5 is a partial side elevational view of the trailer connected to a rail car.

The rail car 26 which is used with the present invention is conventional. As illustrated in FIG. 5, the rail car 26 includes a bed 32 and at least one stanchion having a stanchion plate 28 thereon formed of a ferrous material. The trailer 22 is connected to the stanchion plate 28 in a conventional manner.

The trailer 22 is conventional, except for the differences noted herein. As such, the conventional aspects of the trailer 22 are briefly described.

As illustrated in, among other FIGURES, FIG. 2, the trailer 22 includes a floor having an apron plate 34 with an undercarriage assembly 36 thereunder at its rearward end and an extendable and retractable landing gear assembly 38 thereunder positioned approximately half way between the front end of the trailer 22 and the trailer's longitudinal center of gravity. Opposite side walls 40 and a front wall 41 extend upwardly from the apron plate 34. A roof is provided to close the top of the trailer 22. Rear doors are provided at the rear end of the trailer 22.

As illustrated in FIG. 4, an upper coupler 42 is provided on the underside of the trailer 22 at a position which is proximate to the front thereof. The upper coupler 42 includes a grid plate 44 and a kingpin 46 which extends downwardly therefrom. The grid plate 44 is approximately 100.75 inches wide and thirty-two inches in length. The grid plate 44 forms the base of the upper coupler 42 and the bottom surface of the grid plate 44 is generally flush with the bottom surface of the apron plate 34. This prevents the bottom surface of the trailer 22 from catching on the fifth wheel 24 or the rail car stanchion plate 28 as the connection between the trailer 22 and the semi-tractor 20 or between the trailer 22 and the rail car 26 is being made. The kingpin 46 is centered in the grid plate 44 and is located thirty-six inches rearward of the front of the trailer 22. The length of the trailer 22 can vary. In accordance with conventional operation, the upper coupler 42 interfaces with the fifth wheel 24 of the semi-tractor 20 or interfaces with the stanchion plate 28 of the rail car 26.

The present invention provides a sensor 48 on the trailer 22, and the sensor 48 is configured to sense the presence of the fifth wheel 24 of the semi-tractor 20 as the mechanical connection is made between the semi-tractor 20 and the trailer 22, or to sense the presence of the rail car stanchion plate 28 as the mechanical connection is made between the rail car 26 and the trailer 22. An aperture is formed in the grid plate 44 and the sensor 48 is mounted therein by suitable means, such as fasteners which extend through apertures 51 in the sensor 48. As illustrated in FIG. 3, preferably the sensor 48 is positioned seven inches forward of the kingpin 46 and six inches to the driver's side of the kingpin 46. That is, the sensor 48 is in close proximity to the kingpin 46. The bottom surface of the sensor 48, which is where the sensor head 50 is located, see FIG. 4, is generally flush with the grid plate 44. Because the bottom surface of the sensor 48 is generally flush with the grid plate 44, this prevents the sensor 48 from catching on the fifth wheel 24 or the rail car stanchion plate 28 as the connection between the trailer 22 and the semi-tractor 20 or between the trailer 22 and the rail car 26 is being made. Many different types of sensors 48 can be used, such as a proximity sensor, an electrical contact type sensor, a fiber optic sensor, a photo optic sensor, a magnetic sensor, a capacitance sensor, a Hall Effect sensor, a mechanical sensor, a photo eye sensor, a laser sensor, and the like. It is intended that any sensor currently in use or hereafter developed is within the scope of the present invention so long as it does not require the operator to engage in a secondary operation—that is, an operation other than engaging the semi-tractor and trailer or the rail car and trailer. The preferred sensor used in the present invention is a Ferrous Proximity sensor comprised of a Magnet Biased Reed Switch that utilizes a Form C switch and which is shown in FIGS. 4, 6 and 7 and is discussed further herein.

The fifth wheel 24 and the stanchion plate 28 are horizontal fixtures with large surface areas. When the kingpin 46 interfaces with the fifth wheel 24 of the semi-tractor 20, the fifth wheel 24 comes into close proximity to the sensor 48 and the sensor 48 automatically reacts. Likewise, when the kingpin 46 interfaces with the stanchion plate 28 of the rail car 26, the stanchion plate 28 comes into close proximity to the sensor 48 and the sensor 48 automatically reacts.

Figure 8:
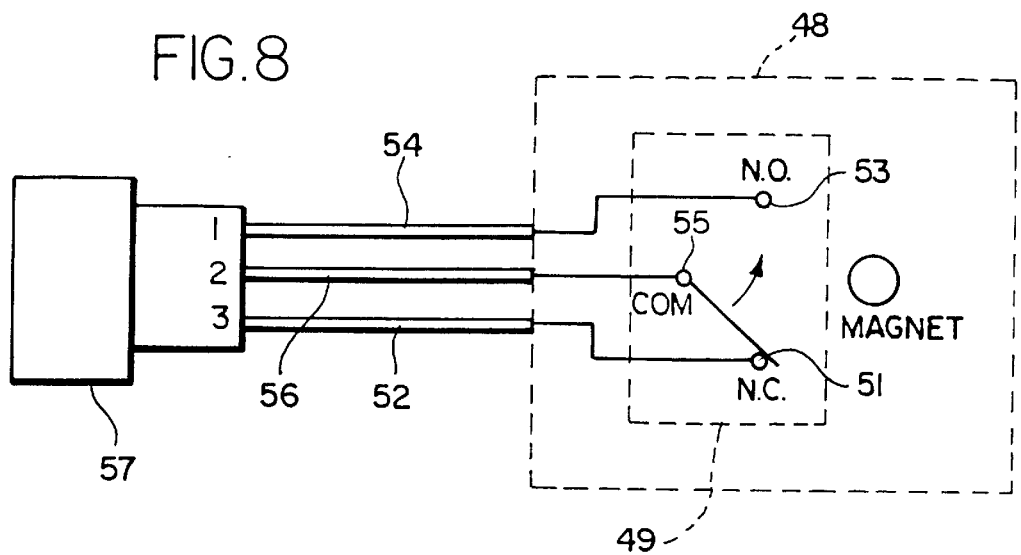
FIG. 8 is an electrical diagram of the preferred sensor.

The preferred sensor 48 used in the present invention is a Ferrous Proximity sensor for sensing ferrous metal within the sensing range, see FIG. 8. The Ferrous Proximity sensor 48 is comprised of a Magnet Biased Reed Switch 49 and includes a normally closed terminal 51, a normally open terminal 53 and a common terminal 55 (a Form C switch). The normally closed terminal 51, the normally open terminal 53 and the common terminal 55 are mounted to a printed circuit board and located inside a plastic housing 58, see FIGS. 6 and 7. The normally closed terminal 51, the normally open terminal 53, the common terminal 55 and the printed circuit board are potted with an epoxy material that protects the internal components of sensor 48. Wire leads 52, 54, 56 which are roughly six inches long and respectively are connected to the normally closed terminal 51, the normally open terminal 53, and the common terminal 55, are soldered to the printed circuit board and exit the plastic housing 58. The wire leads 52, 54, 56 terminate with a connector 57. The connector 57 connects the sensor 48 to control circuitry 60 through harnesses (harnesses not shown). The control circuitry 60 may be the electronic control unit of an anti-lock brake system.

When the fifth wheel 24 of the semi-tractor 20 or the rail car stanchion plate 28 is detected by the sensor 48 (i.e., when the trailer 22 is connected to the semi-tractor 20 or to the rail car 26) the normally open terminal 53 comes into electrical contact with the common terminal 55. That is, when the sensor 48 senses the ferrous target within its sensing range, the sensor 48 causes the reed switch 49 to change state, such that the common terminal 55 and the normally open terminal 53 complete an electrical circuit.

When the fifth wheel 24 of the semi-tractor 20 or the rail car stanchion plate 28 is not detected (no ferrous target is sensed by the sensor 48 within its sensing range), that is, the trailer 22 is standing alone, the normally closed terminal 51 is in electrical contact with the common terminal 55. The common terminal 55 and the normally terminal 53 are unmated.

The use of the common terminal 55 and the normally closed terminal 51 provides a feedback circuit to the control circuity 60. That is, when there is not a ferrous target within range of the sensor 48, the common terminal 55 and the normally closed terminal 51 are mated, thus changing the state of the reed switch 49. This circuit path, utilizing the common terminal 55 and the normally closed terminal 51, provides information to the control circuitry 60. The control circuitry 60 determines that there is not a ferrous target within the sensing range and the control circuitry 60 also determines that the sensor 48 is present and functional (for example, the sensor 48 has not be sheared off of the trailer 22). This is often referred to as a "heartbeat feedback" in that the sensor 48 provides feedback to the control circuitry 60 such that the control circuitry 60 determines that the sensor 48 is functional or "alive".

Accordingly, use of the Form C reed switch 49 provides a circuit path in both a condition where the fifth wheel 24 of the semi-tractor 20 or the rail car stanchion plate 28 is connected to the trailer 22, or a condition where the trailer 22 is standing alone. If a Form A switch were used, only a common terminal and a normally open terminal are provided (no normally closed terminal is provided), then the control circuitry 60 would only be able to determine that the ferrous target is within the sensing range.

Each of these conditions (where the fifth wheel 24 of the semi-tractor 20 or the rail car stanchion plate 28 is connected to the trailer 22, or where the trailer 22 is standing alone) sends an electrical signal to the control circuitry 60 on the trailer 22. The control circuitry 60 can send information to a global positioning satellite (GPS) system 62 which forms part of the trailer tracking system. This allows the owner of the trailer 22 to know the location of the trailer 22, whether the trailer 22 is being used, and if the sensor 48 is functional.

When the electrical signal indicates that the fifth wheel 24 of the semi-tractor 20 or the rail car stanchion plate 28 is detected, the control circuitry 60 on the trailer 22 can also be used to activate feed relay(s) or an electronic module 64 on the trailer 22 to allow various functions of the trailer 22 to be performed, such as allowing the lift gate to be operable. This would prevent an unauthorized user from activating the function.

The present invention senses the presence of the semi-tractor 20 or the rail car 26 without any secondary operation. Moreover, because the rail car 26 does not have an electrical or pneumatic connector, the present invention can be used for this type of application. This provides a distinct advantage over prior art systems which require this secondary operation, because the novel system of the present invention can be used in both manners in which trailers are moved today.

The electrical signal can also be sent to the semi-tractor 20 through the electrical connection between the semi-tractor 20 and the trailer 22 which interacts with a control circuit on the semi-tractor 20. This signal can be used to indicate to the operator that the trailer 22 is connected to the semi-tractor 20. Also, the electrical signal sent to the control circuit on the semi-tractor 20 can be used to activate feed relay(s) or an electronic module on the trailer 22 to allow various functions of the trailer 22 to be performed by the operator, such as allowing the lift gate to be operable.

While a preferred embodiment of the present invention is shown and described, it is envisioned that those skilled in the art may devise various modifications of the present invention without departing from the spirit and scope of the appended claims.

What is claimed is:

1. A system for sensing the physical presence of a semi-tractor as the mechanical connection between a trailer and a fifth wheel of the semi-tractor is made, or for sensing the physical presence of a rail car as the mechanical connection between the trailer and a stanchion plate of the rail car is made, said system comprising:
    a trailer;
    connecting means provided on said trailer for connecting said trailer to a semi-tractor or to a rail car stanchion plate; and
    sensing means provided on said trailer for sensing the physical presence of a fifth wheel of a semi-tractor and a stanchion plate of a rail car, whichever is connected to said trailer.

2. A system as defined in claim 1, wherein said trailer has a floor, and said sensing means is mounted in said floor.

3. A system as defined in claim 2, wherein said sensing means is generally flush with said floor.

4. A system as defined in claim 1, wherein said connecting means comprises a kingpin and said sensing means is mounted generally proximate to said kingpin.

5. A system as defined in claim 1, wherein said sensing means comprises at least one of a proximity sensor, a capacitance sensor, a Hall Effect sensor, a mechanical sensor, a photo eye sensor, and a laser sensor.

6. A system as defined in claim 1, wherein said sensing means comprises a Ferrous Proximity sensor comprised of a Magnet Biased Reed Switch that utilizes a Form C switch.

7. A system as defined in claim 1, wherein said trailer has a floor, said floor comprising an apron plate, and said connecting means comprising a grid plate attached to said apron plate and is generally flush with said apron plate, said sensing means being mounted in said grid plate.

8. A system as defined in claim 1, wherein said sensing means comprises a sensor and control circuitry configured to detect whether said sensor is connected to said control circuitry.

9. A system for sensing the physical presence of a semi-tractor as the mechanical connection between a trailer and a fifth wheel of the semi-tractor is made, or for sensing the physical presence of a rail car as the mechanical connection between the trailer and a stanchion plate of the rail car is made, said system comprising:
    a trailer having a floor;
    a kingpin connected to an underside of said floor for connecting said trailer to a semi-tractor or to a rail car stanchion plate; and
    sensing means provided on said trailer for sensing the physical presence of a fifth wheel of a semi-tractor and a stanchion plate of a rail car, whichever is connected to said trailer, said sensing means being mounted in said floor and being generally flush with said floor, said sensing means being mounted in said floor generally proximate to said kingpin.

10. A system as defined in claim 9, wherein said sensing means comprises at least one of a proximity sensor, a capacitance sensor, a Hall Effect sensor, a mechanical sensor, a photo eye sensor, and a laser sensor.

11. A system as defined in claim 9, wherein said sensing means comprises a Ferrous Proximity sensor comprised of a Magnet Biased Reed Switch that utilizes a Form C switch.

12. A system as defined in claim 9, wherein said floor is comprised of an apron plate, and said connecting means comprises a grid plate attached to said apron plate and is generally flush with said apron plate, said sensing means being mounted in said grid plate.

13. A method comprising the steps of:
    providing a trailer having connecting means for connecting said trailer to a semi-tractor or to a rail car stanchion plate, sensing means for sensing the physical presence of a fifth wheel of a semi-tractor and a stanchion plate of a rail car, and control circuitry;
    using said sensing means to sense the physical presence of a fifth wheel of a semi-tractor and a stanchion plate of a rail car, whichever is connected to said trailer, and sending a signal to said control circuitry; and
    said control circuitry determining whether a fifth wheel of a semi-tractor and a stanchion plate of a rail car is physically present.

14. A method as defined in claim 13, wherein said trailer has a floor, said connecting means is connected to an underside of said floor, and said sensing means is mounted in said floor.

15. A method as defined in claim 13, wherein said sensing means comprises at least one of a proximity sensor, a capacitance sensor, a Hall Effect sensor, a mechanical sensor, a photo eye sensor, and a laser sensor.

16. A method as defined in claim 13, wherein said sensing means comprises a Ferrous Proximity sensor comprised of a Magnet Biased Reed Switch that utilizes a Form C switch.

17. A method as defined in claim 16, wherein said sensing means includes a common terminal, a normally closed terminal and a normally open terminal, such that when said fifth wheel or said stanchion plate is within the sensing range of said sensing means, said normally open terminal comes into electrical contact with the common terminal and a signal is sent to said control circuitry.

18. A method as defined in claim 16, wherein in response to said signal from said sensing means, said control circuitry sends a signal to a global positioning satellite system.

19. A method as defined in claim 16, wherein in response to said signal from said sensing means, said control circuitry sends a signal to activate components on said trailer to allow various functions of the trailer to be performed.

20. A method as defined in claim 16, wherein said sensing means includes a common terminal, a normally closed terminal and a normally open terminal, such that when said fifth wheel or said stanchion plate is not within the sensing range of said sensing means, said normally closed terminal comes into electrical contact with the common terminal and a signal is sent to said control circuitry.

21. A method as defined in claim 20, wherein in response to said signal from said sensing means, said control circuitry sends a signal to a global positioning satellite system.

22. A method as defined in claim 13, wherein in response to said signal from said sensing means, said control circuitry sends a signal to a global positioning satellite system.

\* \* \* \* \*